(12) United States Patent
Chen et al.

(10) Patent No.: US 7,275,935 B2
(45) Date of Patent: Oct. 2, 2007

(54) UNIVERSAL BACKPLANE CONNECTION OR COMPUTER STORAGE CHASSIS

(76) Inventors: Kuang Wei Chen, 14257 E. Don Julian Rd., City of Industry, CA (US) 91746; Sio Fu, 14257 E. Don Julian Rd., City of Industry, CA (US) 91746

( * ) Notice: Subject to any disclaimer, the term of this patent is extended or adjusted under 35 U.S.C. 154(b) by 0 days.

(21) Appl. No.: 11/364,701

(22) Filed: Feb. 27, 2006

(65) Prior Publication Data
US 2006/0194460 A1 Aug. 31, 2006

Related U.S. Application Data

(60) Provisional application No. 60/657,303, filed on Feb. 28, 2005.

(51) Int. Cl.
*H05K 7/06* (2006.01)
(52) U.S. Cl. .................................... 439/61; 361/788
(58) Field of Classification Search ........ 361/683–687, 361/788; 439/61, 928.1
See application file for complete search history.

(56) References Cited

U.S. PATENT DOCUMENTS 5,757,617 A * 5/1998 Sherry ..................... 361/685

6,743,054 B2 * 6/2004 Wu ............................ 439/638

* cited by examiner

*Primary Examiner*—Neil Abrams
(74) *Attorney, Agent, or Firm*—Charles C. H. Wu; Wu & Cheung, LLP

(57) ABSTRACT

A universal backplane connection (3) for computer storage chassis. The overall backplane connection (3) has at least one universal backplane (30) that is connected to the SAS expander daughter board (33), and to the hard disk drives (10) through its HDD (e.g. SAS) connector (39). Each universal backplane board has discrete components onboard, such as resistors, capacitors, voltage regulation ICs, Light Emitted Diodes (LED), HDD connector receptacles, power connector, General Purpose Input and Output ICs and a high-speed connector. Some of the discrete components and ICs Regulate the DC current to provide a safe and stable power source to the HDDs (10). The HDD connector (39) enable "hot-swap" function to the HDD (10), while other discrete components and amplifiers ensure data integrity of the system. LEDs provide a system status signal to the users. A high-speed connector (37), e.g. SAS connector, connects the universal backplanes (30) to the SAS expander daughter board (33)

14 Claims, 13 Drawing Sheets

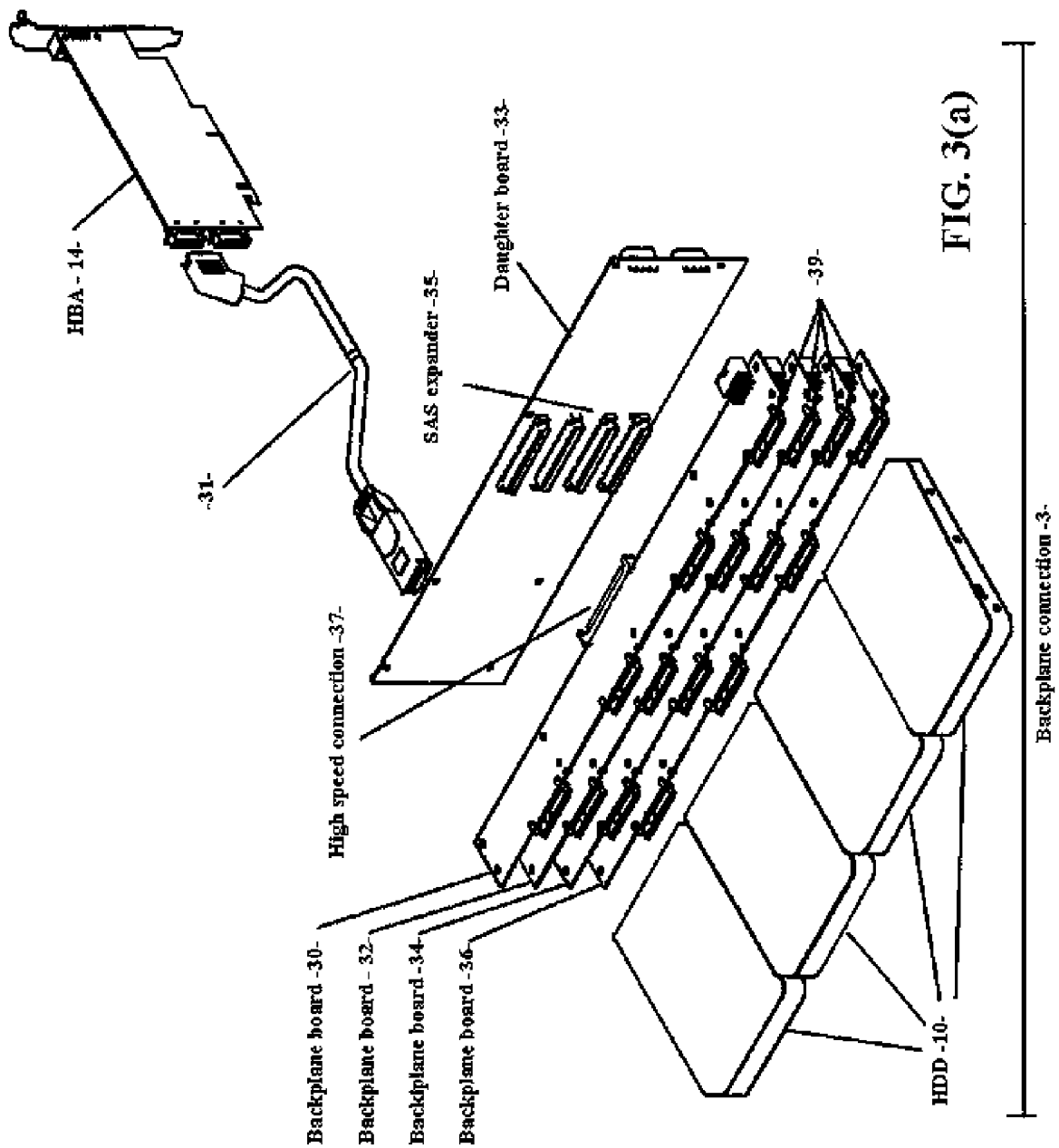

2U-12 drive 2U-20SFF drive

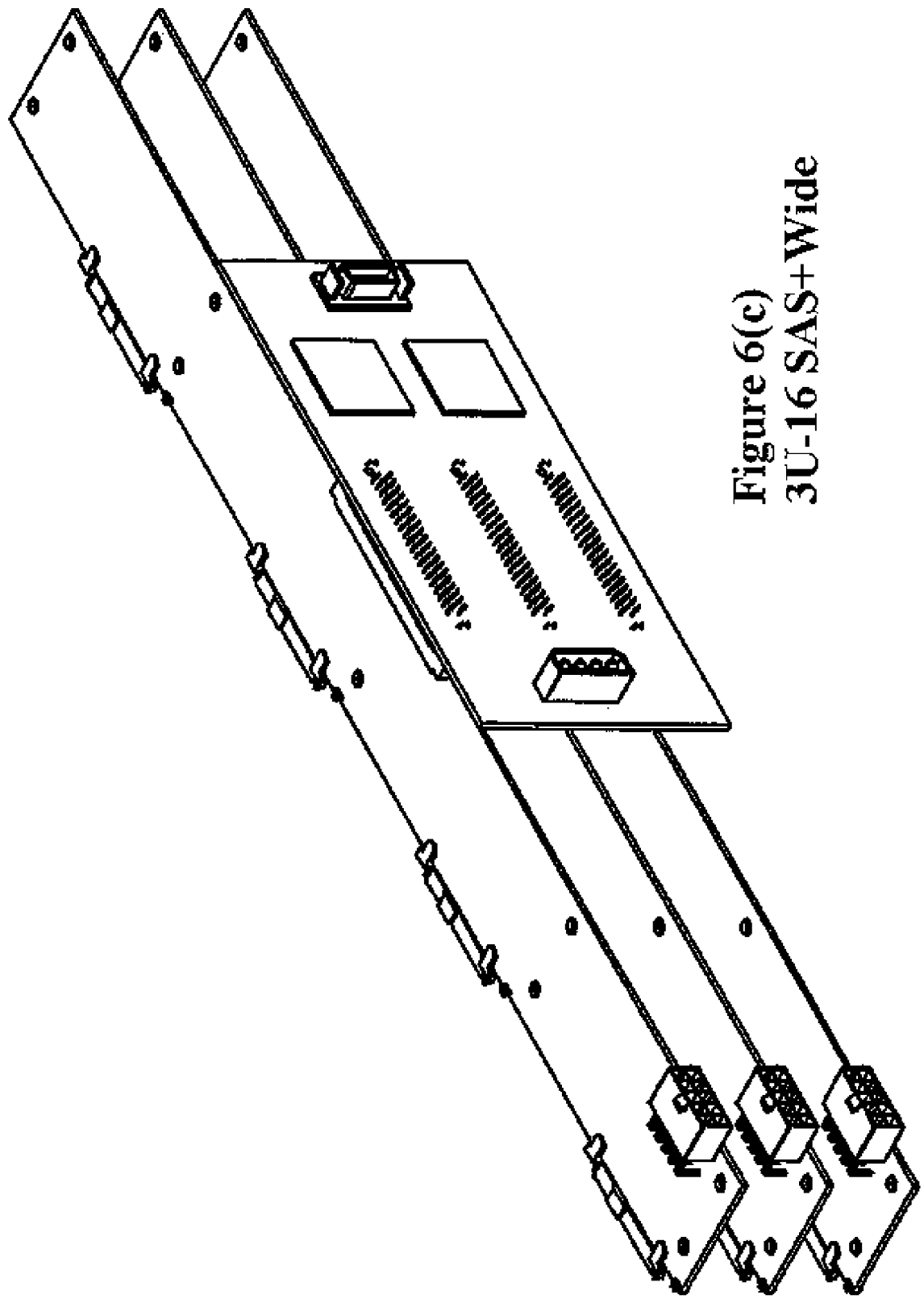

5U-24 drive 5U-24 drive

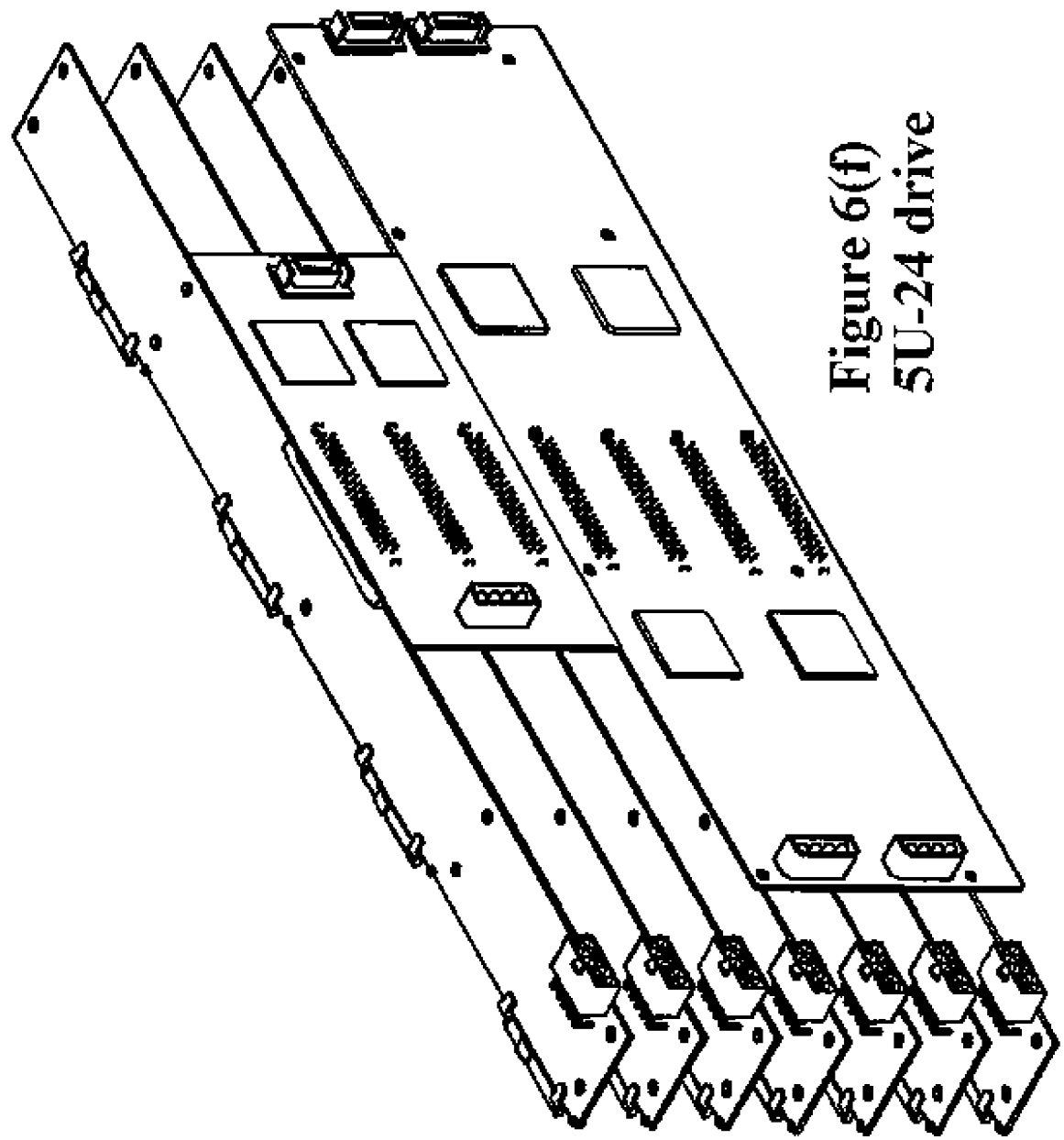

UNIVERSAL BACKPLANE CONNECTION OR COMPUTER STORAGE CHASSIS

RELATED APPLICATION

The present application claims priority from a provisional application, filed on Feb. 28, 2005 to the United States Patent and Trademark Office, Ser. No. 60/657,303, entitled "BACKPLANE CONNECTION FOR SERIAL ATTACHED SCSI (SAS) STORAGE PRODUCTS," the entire disclosure of which is incorporated as if fully set forth herein.

FIELD OF THE INVENTION

The present invention relates to the computer storage chassis, and more particularly relates to the backplane connection technology of the computer storage chassis.

BACKGROUND OF THE INVENTION

As more and more data are created and communicated through the networks, it has become quite preferred, if not essential, for corporations to address data storage issues. To store massive amount of data, racks of hot-swappable hard disk drives ("HDD") have been developed, commonly called a storage chassis. Referring to FIG. 1, a storage chassis typically has a host of hot-swappable HDDs 10, which is connected to a backplane with expanders (12) through a HDD connector 39. The backplane 12 is connected to the host bus adapter 14 ("HBA") through an SAS HBA connector 31. The connection methodology is commonly referred to as an Serial Attached SCSI ("SAS") connection. FIG. 1 is now further described as follows.

The backplane 12, such as the one shown in FIG. 1, typically refers to a circuit board containing sockets into which other circuit boards or devices can be plugged in. In the data storage field, a pluggable device refers to a HDD. Backplanes are often described as being either active or passive. Active backplanes contain, in addition to the sockets, logical circuitry that performs computing functionality. In contrast, passive backplanes contain almost no computing circuitry.

The SAS connection, such as the one shown in FIG. 1, is a newer generation serial communications protocol for devices designed to allow for much higher speed data transfers. SAS uses serial transfer, instead of the parallel transfer found in traditional SCSI devices. SAS still uses SCSI commands for interacting with SAS devices.

Expanders on the backplane 12 refer to active components in the SAS connection. Expanders are the key to Serial Attached SCSI's remarkable scalability. Each of these low-cost switches enables up to 128 point-to-point connections to be made off a single HBA/enclosure, and a total of 16,384 SAS devices can be aggregated while preserving performance and reliability.

In today's market, delivering high-density, scalable and reliable storage solutions to market quickly is a necessary goal for storage solution designers, original equipment manufacturers (OEMs), system integrators. If achieved, they can keep the competitive edge needed for continued success. The aforementioned SAS connection has defined a device called an "expander," which allows thousands of combinations of storage expansion to achieve the needs for IT professional on storage availability, flexibility, scalability, and performance. However, the conventional backplane connection requires IT engineers to create many more complex storage backplanes that may be dedicated to only a single solution.

The pre-dominant high availability physical interconnect technology between the hot-swappable HDDs and storage HBAs rely on transmission of data streams through a piece of physical PCB board (Backplane Board). The SAS expander is laid out on the backplane to provide multiple functionality enabled by the SAS connection.

With the conventional method, all expanders 20 are embedded on the backplane board 12, as shown in FIG. 2. The conventional method forces designers to design backplanes with more than twenty PCB layers, which tend to generate unnecessary signal skew, crosstalk and DC interference, and block airflow, etc. Also, such design restricts failed over and device addressability as well as configuration flexibility, and stands as a barrier to throughput performance, storage scalability, system flexibility and availability.

Further, because of the size of the expander footprint and/or other IC components form factor, IT engineers have to carefully confront the trade-offs between reliability, scalability, performance and availability of the application requirements. This inflexibility on the conventional backplane design forced designers to implement separate and distinct systems for each type of solution. Such approach translates to high costs of additional backplane design, additional layers, prototypes, troubleshoot, manufacture and support. A single failure of individual components in a backplane requires a replacement of a new backplane, causing single points of failure to block access to the system. This results in high support cost and increased total cost of ownership.

Conventional Design of SAS Backplane.

To illustrate, a conventional method of designing an SAS backplane is described. The SAS backplane consists of both active and passive components in the same backplane. The active part includes the expanders that perform computing functions to enable multiple HDD support and other SAS topology. The function of the SAS backplane is to connect the hot-swappable HDD to the HBA that can enable SAS topology and drive expansion. The conventional SAS backplane consists of:

a. HDD hot-pluggable connector receptacles, which are used to connect to the hot-swappable HDD, and enable the HDD to be replaceable without turning off the system. Because of the large footprint of an SAS expander and/or other active/passive components, the receptacles can only be assembled with surface mounting technology (SMT), which causes structural weakness when compared with through-hole mounting technology.

b. Power connectors, which provide power to hot-swappable HDD, all active and passive components of the backplane. The conventional backplane may require many power connectors on the backplane, and require extra current and voltage stabilizers to be presented. Thus, it results in high cost and complex and unstable circuitry.

c. Other discrete components, such as power MOSFET, resistors, capacitors, diodes, isolators, sensors, transistors, transformer, which provide various functions on the backplane. The complicated circuitry of the conventional SAS backplane forces designers to layout many layers of trace, thus resulting in longer design time, higher design and manufacturer's difficulty and cost.

d. Traditional backplanes also include hot-swappable HDD status LEDs to provide indication to the user HDD status through the Serial General Purpose Input/Output.

e. SAS expanders, the activity component of the backplane, which enable scalability, flexibility, availability and performance of the SAS storage system. The SAS expander chip enables single cable connection from the HBA to support up to 128 devices per cable. The expanders comply with the SAS standard which includes the proven SCSI command set, while allowing for point-to-point connection, increased device bandwidth, higher availability with dual-ported drives, enhanced reliability, and greater flexibility. However, the SAS expander chip has a large foot print, thus requiring a large area of placing space and complex circuitry, making it a very tough task to design.

f. A conventional backplane contains board-to-cable connectors that are used to connect the backplane to the HBAs. The SAS technology enables a dual-ported host that enhances better performance, reliability and greater flexibility. However, that will also require more backplane-to-host (HBA) connectors, making the limited conventional backplane space dense.

Therefore, it is desirable to avoid having to replace the whole backplane due a single or even minor failure.

It is also desirable to reduce the cost of support, as well as cost of ownership.

SUMMARY OF THE PRESENT INVENTION

A universal backplane connection for computer storage chassis is disclosed. The overall backplane connection has at least one physical board that is connected to the SAS expander daughter board, and to the hard disk drives through its HDD (e.g. SAS) connector. Each universal backplane board has discrete components on-board, such as resistors, capacitors, voltage regulation ICs, Light Emitted Diodes (LED), HDD connector receptacles, power connector, General Purpose Input and Output ICs and a high-speed connector. Some of the discrete components and ICs regulate the DC current to provide a safe and stable power source to the HDDs. The HDD connector enables "hot-swap" function to the HDD, while other discrete components and amplifiers ensure data integrity of the system. LEDs provide a system status signal to the users. The high-speed connector, e.g. SAS connector, connects the universal backplanes to the SAS expander daughter board.

The universal backplane in accordance with the present invention is designed such that the same backplane can still be used in different configurations, even if the daughter board (or boards) is changed or customized in the configuration. As such, the universality and re-usability in a conventional backplane connection is extracted and embodied in the universal backplane of the present invention. Such extraction allows the other functionality that needs to be customized for different configurations to be minimized by using the daughter board, or boards. Customizing the daughter board of the present invention for different configurations, while keeping the universal backplane of the present invention unchanged, has proved to be both efficient and effective. As each design calls for, a different number of the universal backplane board can be used to support however many daughter boards there are according to the configuration.

With the implementation of the universal backplane board and the daughter board(s), a high-speed data transfer between the boards can be achieved by using high-speed connectors, which bridge the gap between two conductors in a circuit. The high-speed connector is used to connect the universal backplane boards to the daughter board and is designed for leading edge applications that requires a speed of between 3-12 GBs and high interconnect density. The connector provides data integrity, high speed integrity and flexibility when a variety of SAS storage applications is needed through the SAS expander daughter board. Currently, the high-speed connector is Serial Attached SCSI connection, but may be another high-speed connector when required by the higher data speed, or when faster connectors emerge. For the purpose of illustration, reference is made to SAS in the following description, but it should be apparent to those skilled in the art that SAS is but only one of the many possible high-speed connectors that may be used.

BRIEF DESCRIPTION OF THE DRAWINGS

FIGS. 6(a)-(f) illustrate more exemplary solutions enabled by the backplane connection of the present invention

DETAILED DESCRIPTION OF THE PREFERRED EMBODIMENTS

A universal and scalable backplane connection for computer storage chassis is disclosed. In the following detailed description, numerous specific details are set forth to provide a full understanding of the present invention. It will be obvious, however, to one ordinarily skilled in the art that the present invention may be practiced without some of these specific details. In other instances, well-known structures and techniques have not been shown in detail so as to avoid unnecessarily obscuring the present invention.

Conventional SAS Backplane Design.

Figure 1:
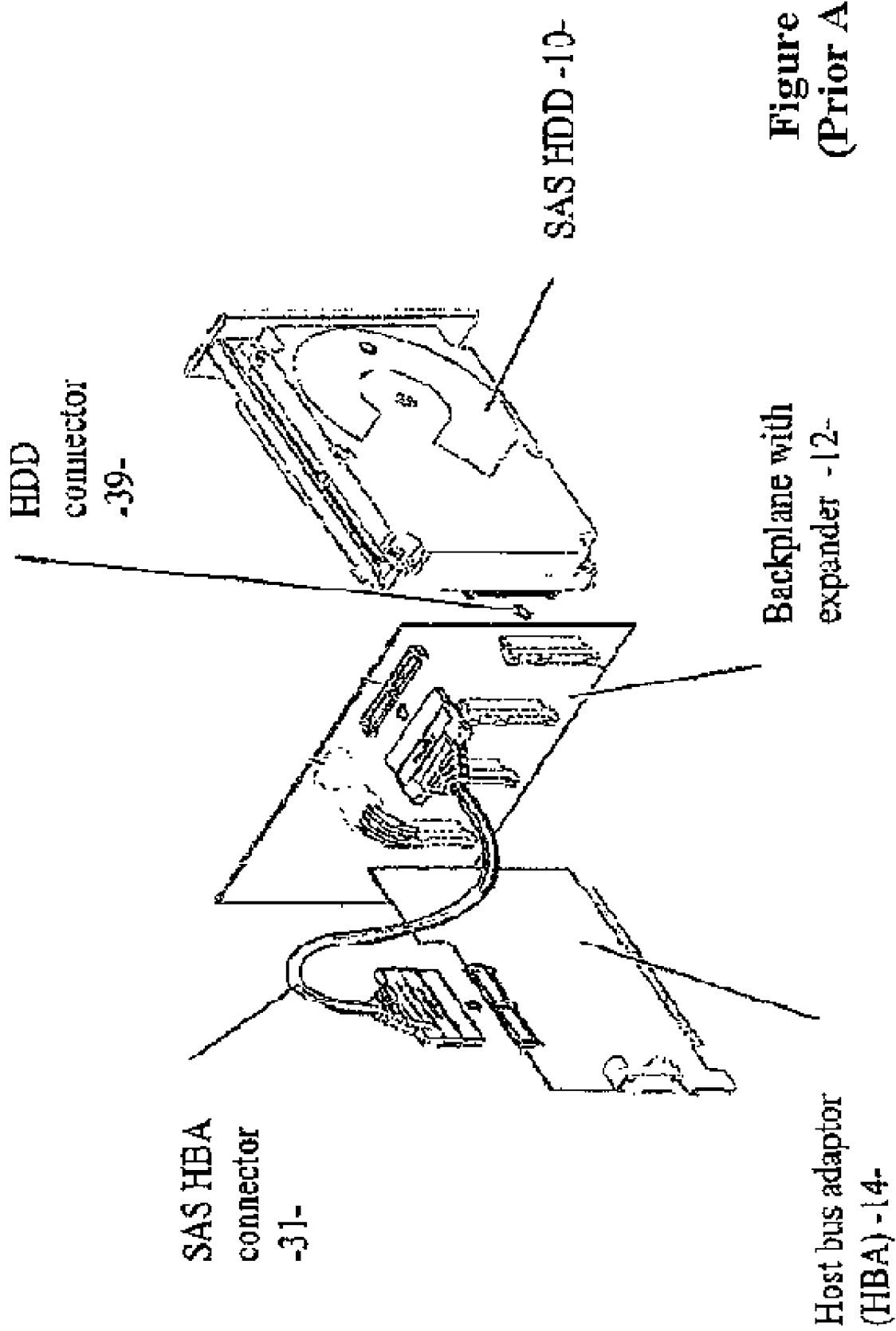
FIG. 1 illustrates a conventional storage backplane and daughter board connection.
Figure 2:
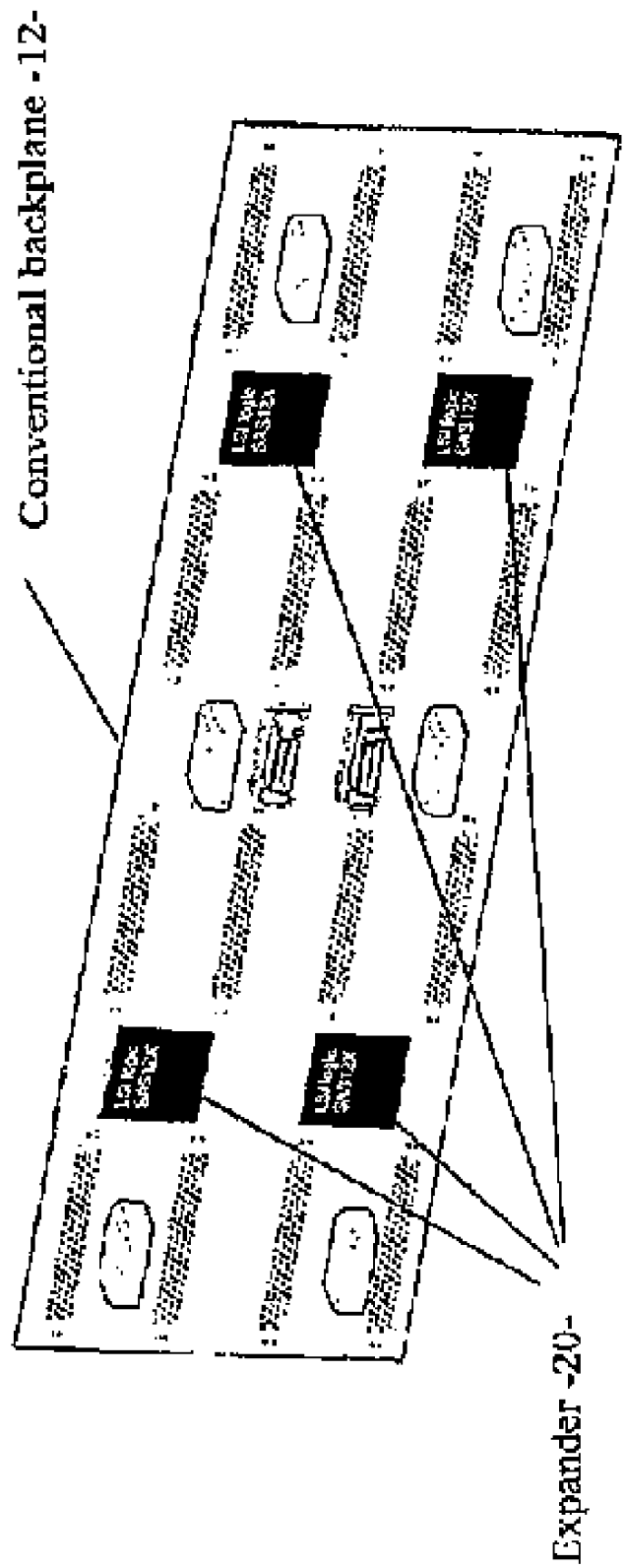
FIG. 2 illustrates a conventional backplane with expanders.

To design a conventional SAS backplane such as one illustrated in FIGS. 1 and 2, the following the methodology is typically utilized:

a. The designer starts out by understanding what is needed on the overall SAS solution, and creating design specifications for, e.g., what SAS expander 20 to be used, how many expanders, how many HDDs 10, how many HBA 14 redundancy needed.

b. The designer then looks for all components, such as connectors, expanders, and have all the data sheet, specification and dimension.

c. The mechanical constraint of the backplane board 12 is defined.

d. The circuitry is designed, incorporating the mechanical constraint, layout the backplane board 12.

e. If the layout does not work with the mechanical constraint, then, the designer needs to rework on the mechanically part until the layout fits in. The complexity of the SAS solution ends up with many layers of this conventional SAS expander board 12.

f. Prototype is done for the backplane board 12, which, with many layers, is costly. Then, functional testing on the backplane is started. Because the complexity and the excessive layers of the conventional backplane SAS board design, first-time success rate is highly unlikely.

g. Troubleshooting is done if the functional test fails. Troubleshooting time and cost is significantly increased, due to the complexity and excessive layers of the conventional daughter board.

h. Upon passing the functional testing, the board will undergo environmental testing. Because of the dense design in the small form factor, environmental testing (such as thermal test) is difficult, and may cause complete redesign of the backplane or project cancellation.

i. If the board passes environmental testing, mass production is started. Due to the complexity of design with excessive layout, a very high cost of the backplane is inevitable.

j. There will be very little flexibility in the backplane, because it can only work for the specification that it is designed for.

In light of the many shortcomings of the conventional backplane connection, it is increasingly apparent that IT engineers require new solutions that bring new levels of ease and simplicity. The more important characteristic of the backplane connection in accordance with the present invention is its flexibility to support every storage solution available in the storage world. This backplane connection comprises two physical parts: a Drive Backplane Board and an Expander Daughter Board. These two boards are connected with easy-swap high-speed connectors, enabling highly flexible storage topologies. The new backplane connection can support swappable daughter boards which is interchangeable within the same enclosure, and can be used to build high-availability systems with no single points of failure.

The universal backplane connection methodology in accordance with the present invention is adapted to utilize the same backplane board for multiple solutions, simply by changing or customizing the Daughter board with the required expansion capability. It thus provides a "pay-as-you-grow" platform so that users or customers can migrate to their unique solutions as needed. Because every solution uses the same universal backplane, cost reduction can achieved. In addition, it offers competitive advantage in the marketplace by meeting compliance deadlines, lowering the cost of building (as opposed conventional backplanes) and offering reliable, user-friendly products to their end-customers ahead of any other competitor in the marketplace.

Figure 3:
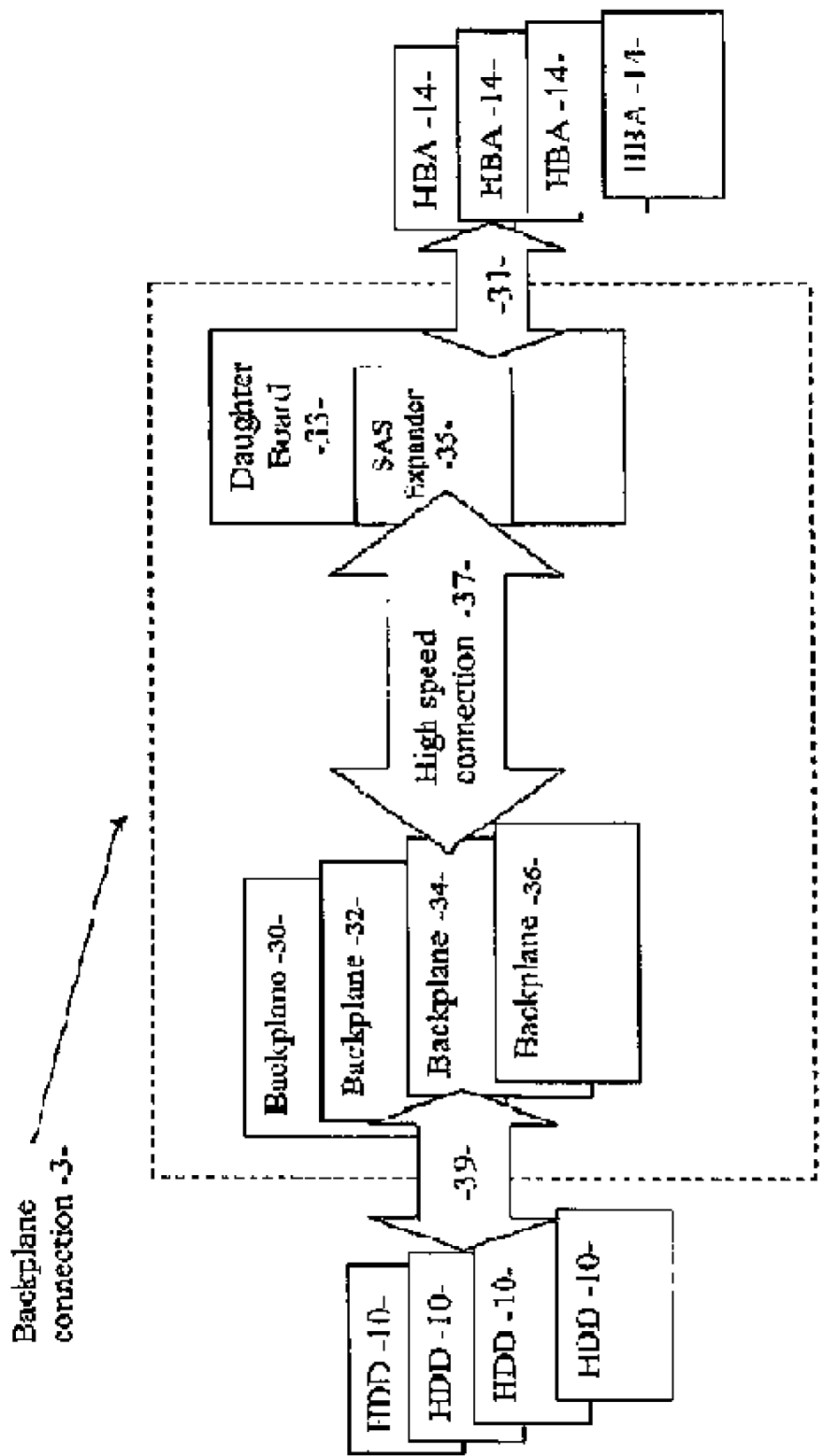
FIGS. 3(a) and (b) illustrate an exemplary backplane connection in accordance with the present invention, where four exemplary universal backplane boards 30, 32, 34, 36 are connected to an exemplary daughter board 33.

Reference is first turned to FIGS. 3(*a*) and (*b*), where four exemplary universal backplane boards 30, 32, 34, 36 connected to an exemplary daughter board 33 in accordance with the present invention is illustrated. A conventional backplane refers to a physical PCB board with many layers of traces, connected to many discrete components and ICs. The PCB enables the HDD to connect to the Host Bus Adapter that can support hot-swap redundancy function and other safety features, rendering the computer storage system more scalable, flexible and reliable.

With references to FIGS. 3(*a*) and (*b*), the overall backplane connection 3 in accordance with the present invention has at least one physical board (shown with four of the same universal backplane board 30, 32, 34, and 36; herein referred to all as backplane board 30) that is connected to the SAS expander daughter board 33, and to the hard disk drives 10 through its HDD (e.g. SAS) connector 39. Each universal backplane board 30 has discrete components on-board, such as resistors, capacitors, voltage regulation ICs, Light Emitted Diodes (LED), HDD connector receptacles, power connector, General Purpose Input and Output ICs and a high-speed connector 37. Some of the discrete components and ICs regulate the DC current to provide a safe and stable power source to the HDDs 10. The HDD connector 39 enables "hot-swap" function to the HDD 10, while other discrete components and amplifiers ensure data integrity of the system. LEDs provide a system status signal to the users. The high-speed connector 37, e.g. SAS connector, connects the universal backplanes 30 to the SAS expander daughter board 33.

The universal backplane 30 in accordance with the present invention is designed such that the same backplane can still be used in different configurations, even if the daughter board 33 (or boards) is changed or customized in the configuration. As such, the universality and re-usability in a conventional backplane connection (as in FIGS. 1 and 2) is extracted and embodied in the universal backplane 30 of the present invention. Such extraction allows the other functionality that needs to be customized for different configurations to be minimized by using the daughter board 33, or boards. Customizing the daughter board 33 of the present invention for different configurations, while keeping the universal backplane 32 of the present invention unchanged, has proved to be both efficient and effective. As each design calls for, a different number of the universal backplane board 30 can be used to support however many daughter boards there are according to the configuration.

With the implementation of the universal backplane board and the daughter board(s), a high-speed data transfer between the boards can be achieved by using high-speed connectors, which bridge the gap between two conductors in a circuit. As shown in FIG. 3(*b*), the high-speed connector 37 is used to connect the universal backplane boards 30 to the daughter board 33 and is designed for leading edge applications that requires a speed of between 3-12 GBs and high interconnect density. The connector 37 provides data integrity, high speed integrity and flexibility when a variety of SAS storage applications is needed through the SAS expander daughter board. Currently, the high-speed connector 37 is Serial Attached SCSI connection, but may be another high-speed connector when required by the higher data speed, or when faster connectors emerge. For the purpose of illustration, reference is made to SAS in the following description, but it should be apparent to those skilled in the art that SAS is but only one of the many possible high-speed connectors that may be used.

The SAS expander daughter board 33 connects to, at one end, the universal backplane board 30 through the high-speed connector 37, and to the SAS HBA 14 through SAS cable 31 at another end. The SAS expander daughter board 33 may have one or more SAS expander IC 35, with discrete components and ICs, power connectors, switches and jumpers. The expander IC 35, as is known to those skilled in the art, helps "expand" the scalability, reliability, accessibility and flexibility of a storage system.

Figure 4:
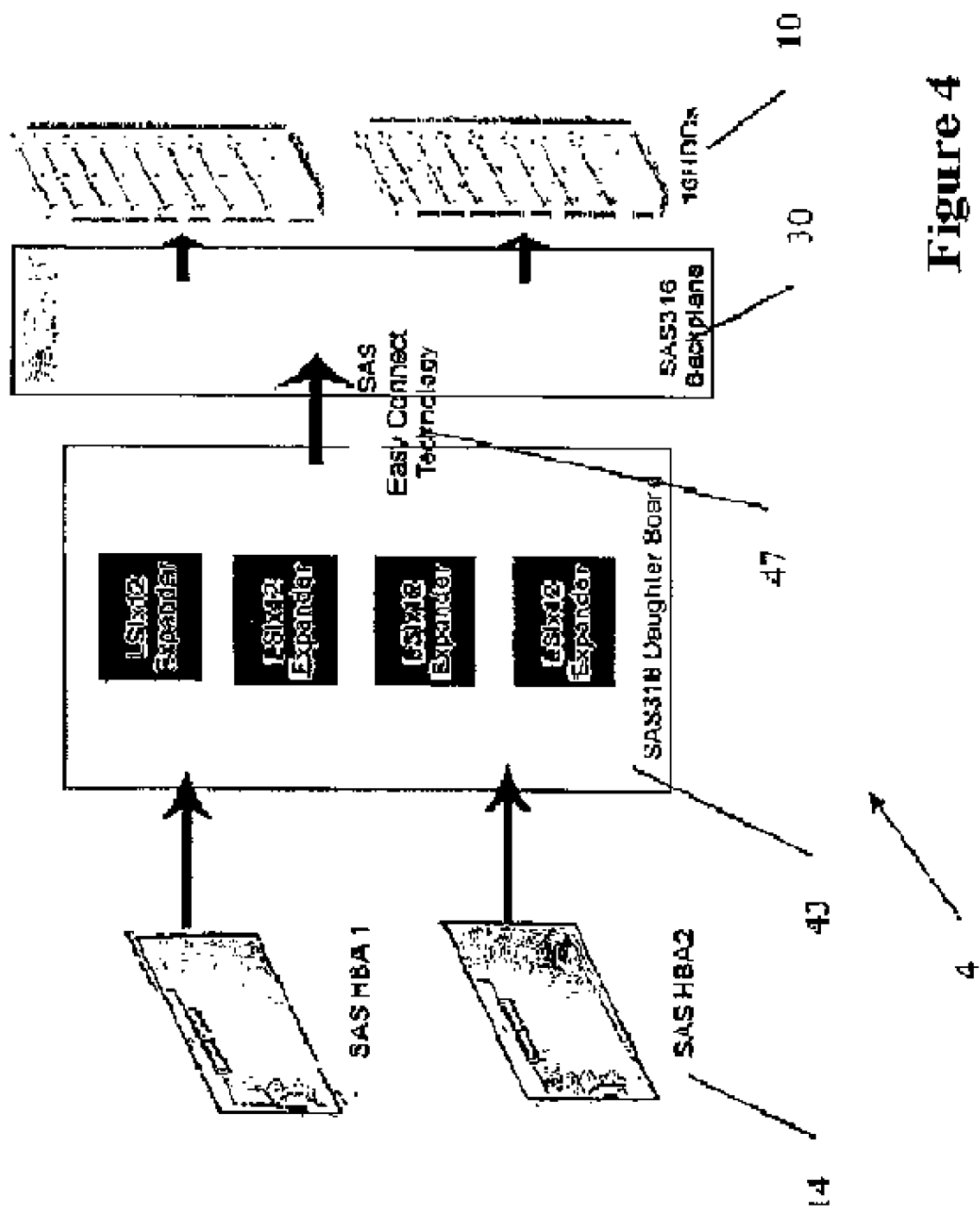
FIG. 4 illustrates a simplified diagram illustrating an exemplary embodiment 4 for a 3U-16 Bay solution.

FIG. 4 is a simplified diagram illustrating an exemplary backplane connection 4 for a 3U-16 Bay solution. As illustrated, two SAS HBAs 14 are connected to the daughter board 43, which now has been customized to have four expander chips 45 on-board. The daughter board 43 is connected to the universal backplane board 30 through a high-speed connection 47 such as the SAS. The backplane connection 4, as shown, can support sixteen HDDs 10, while requiring no modification on the backplane board 30, even as the daughter is customized.

Improved Method of Designing SAS Backplane.

Figure 5:
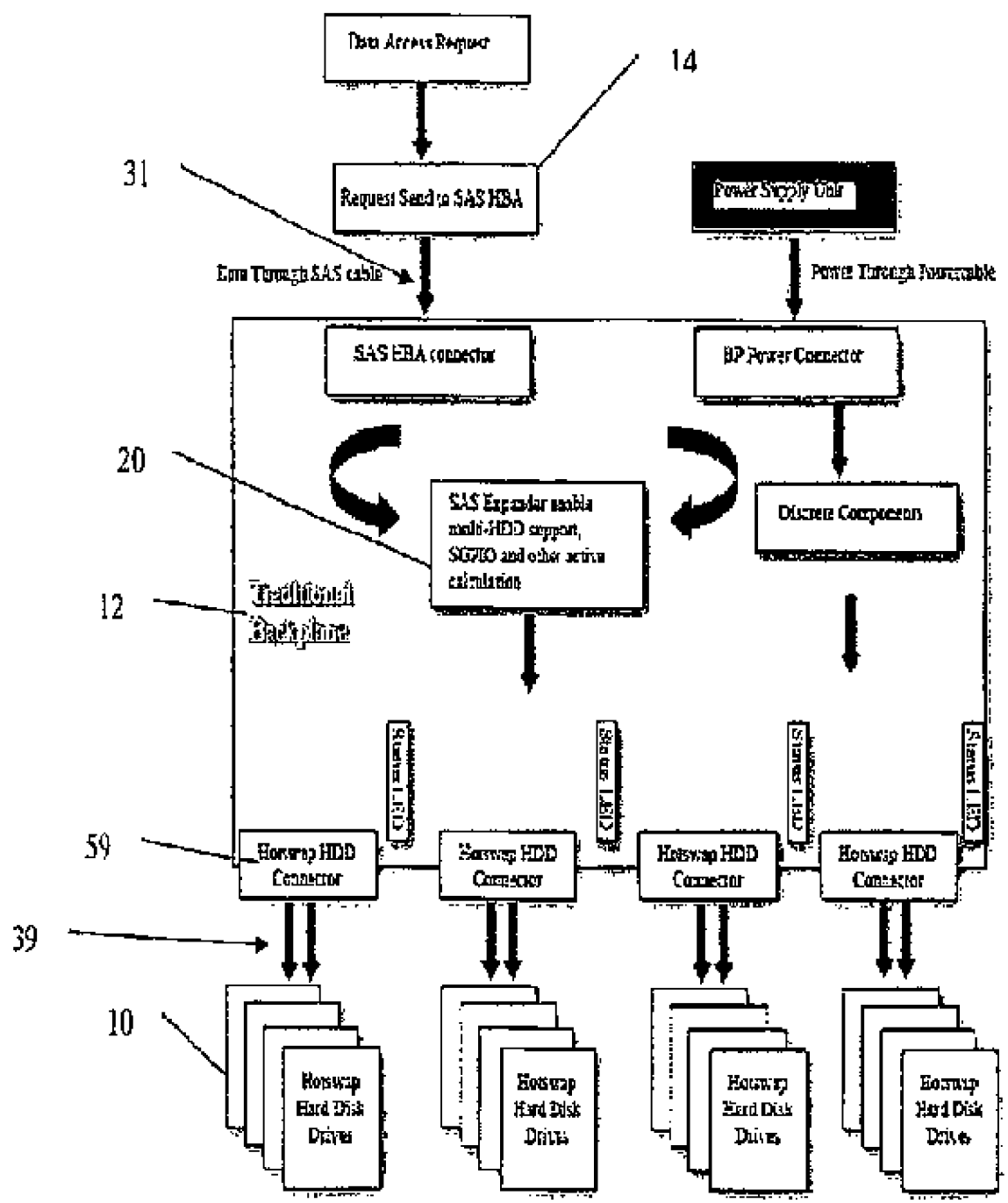
FIG. 5(a) illustrates a conventional backplane connection scheme with expander 20.
FIG. 5(b) illustrates an exemplary backplane connection technology in accordance with the present invention.
Figure 5:
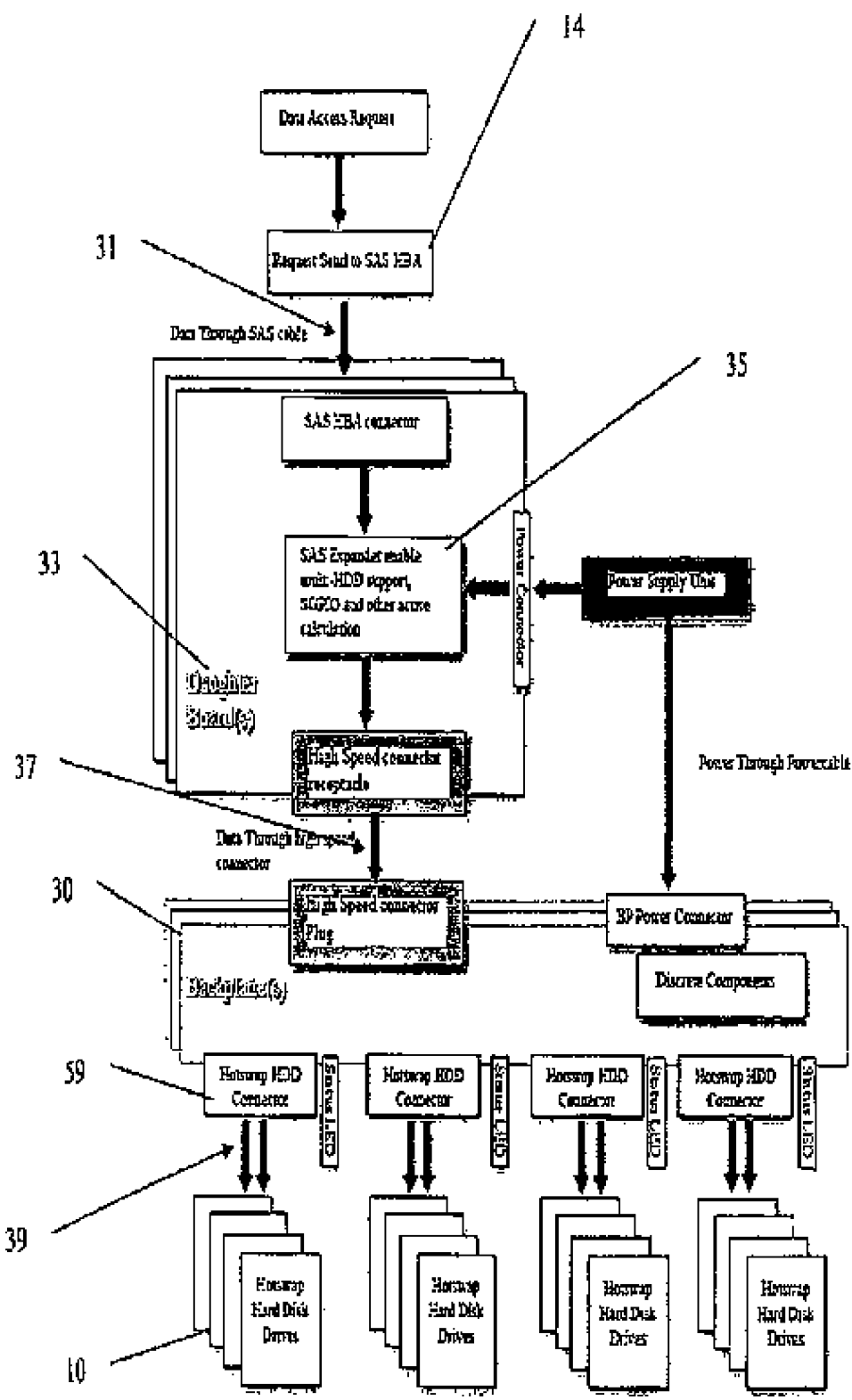

To illustrate the numerous advantages, the methodology of designing the SAS backplane connection in accordance with the present invention is now described with reference to FIG. 5(b). The main goal of the new SAS backplane design is to save cost, time, simplify design time and development, and provide greater flexibility. The new design is to separate the conventional backplane into two parts:

a. The passive backplane 30 (the "universal backplane") that has all the passive components and circuitry to the SAS HDD. The universal backplane design can be used again and again for any different SAS daughter board.

b. The active backplane 33 (the "daughter card") that has the computing active components (e.g. expander chips 35 and SGPIO) circuitry. The daughter board 33 connects to the SAS HBAs 14 with an SAS cable 31. The daughter board 33 makes it very easy to customize every time.

c. The backplane(s) 30 and daughter board(s) 33 are connected with a high-speed connector 37, where preferably each backplane 30 already has the receptacle and daughter board 33 has the plug. In the current SAS specification (SAS1.0), the high speed connector is referred to as the "SCA80." Of course, the plug/receptacle assignment could be reversed or interchanged between the backplane 30 or the daughter card 33.

Passive Backplane 30.

The passive backplane 30, or the universal backplane, has:

a. HDD hot-pluggable connector receptacles 59 that are used to connect to the hot swappable HDD 10, and enable the HDD 10 to be replaceable without turning off the system.

b. Power connectors, which provide power to hot-swappable HDD 10, all passive components of the backplane. Because the backplane has only limited number of discrete components and HDD, only one power connector is needed on the one side of the backplane 30.

c. Other discrete components, such as the power MOSFETs, resistors, capacitors, diodes, isolators, sensors, transistors, transformers that provide various functions on the backplane. The simple circuitry of the SAS backplane 30 requires only 3 to 4 layers of traces, thus reducing design time and cost.

d. HDD status LED to provide indication to the user HDD status through the Serial General Purpose Input/Output of the daughter board through the high speed connector.

e. The high speed connector receptacle 59 that is used to connect to the daughter board to receive signal from the SAS HBA, expander and GSPIO.

Daughter Board 33.

The daughter board, in accordance with the present invention, generally has:

a. SAS expander(s) 35 and other active components that enable scalability, flexibility, availability and performance of the SAS storage system. The SAS expander chip 35 enables single cable connection from the HBA 14 to support up to 128 devices per cable. The expanders 35 comply with the SAS standard which includes the proven SCSI command set, while allowing for point-to-point connection, increased device bandwidth, higher availability with dual-ported drives, enhanced reliability. The separation and extraction of the daughter board from the backplane provides greater flexibility and easier development of the SAS topology.

b. Power connectors, which provide power to the expanders and other passive/active components.

c. Board-to-cable connector(s) 35 that is connected to the HBA(s).

d. The plug for the high-peed connector 37 that is connected to the backplanes.

New Backplane Connection Methodology.

In accordance with the present invention, a new backplane connection can be achieved according to the following methodology:

a. The designer starts to understand what is needed on the SAS solution. Have design specification, for example, what SAS expander to be used, how many expanders, how many HDDs, how many HBA redundancy needed.

b. The designer looks for all components, such as connectors, expanders, and have all the data sheet, specification and dimension. Because the backplane is already available, fewer components are needed so as to reduce in documentation and study curve.

c. Because the universal backplane is already available, the designer only needs to calculate how many backplanes are required for any given amount of the HDD.

d. The circuitry is designed, using the mechanical constraint, layout the daughter board. Since fewer components are needed on the daughter board, the designer could shorten the design time and design complexity.

e. The daughter board is prototyped, which costs less and is easier to make.

f. Functional testing is performed, that can be passed more easily, because the backplane is off-the-shelf mass produced, and the daughter board is less complex.

g. If the board does not pass the functional test, it will be fast and less expensive for troubleshooting.

h. Environmental testing is conducted, which is also easier to pass because the backplane is horizontal to streamline of the airflow, and the daughter board can be in a much smaller form factor because fewer components are used.

i. Mass production is faster and cheaper, because of fewer layers of the PCB, the backplane is common stock part. The solution can launch to the market much faster and cheaper than the conventional backplane design method.

j. Due to their flexibility, both the backplane and daughter board can be used in other system or solution. It is also flexible and easy to design a new daughter board, since the same daughter board can also be used on other chassis if it fit mechanically.

Figure 6A:
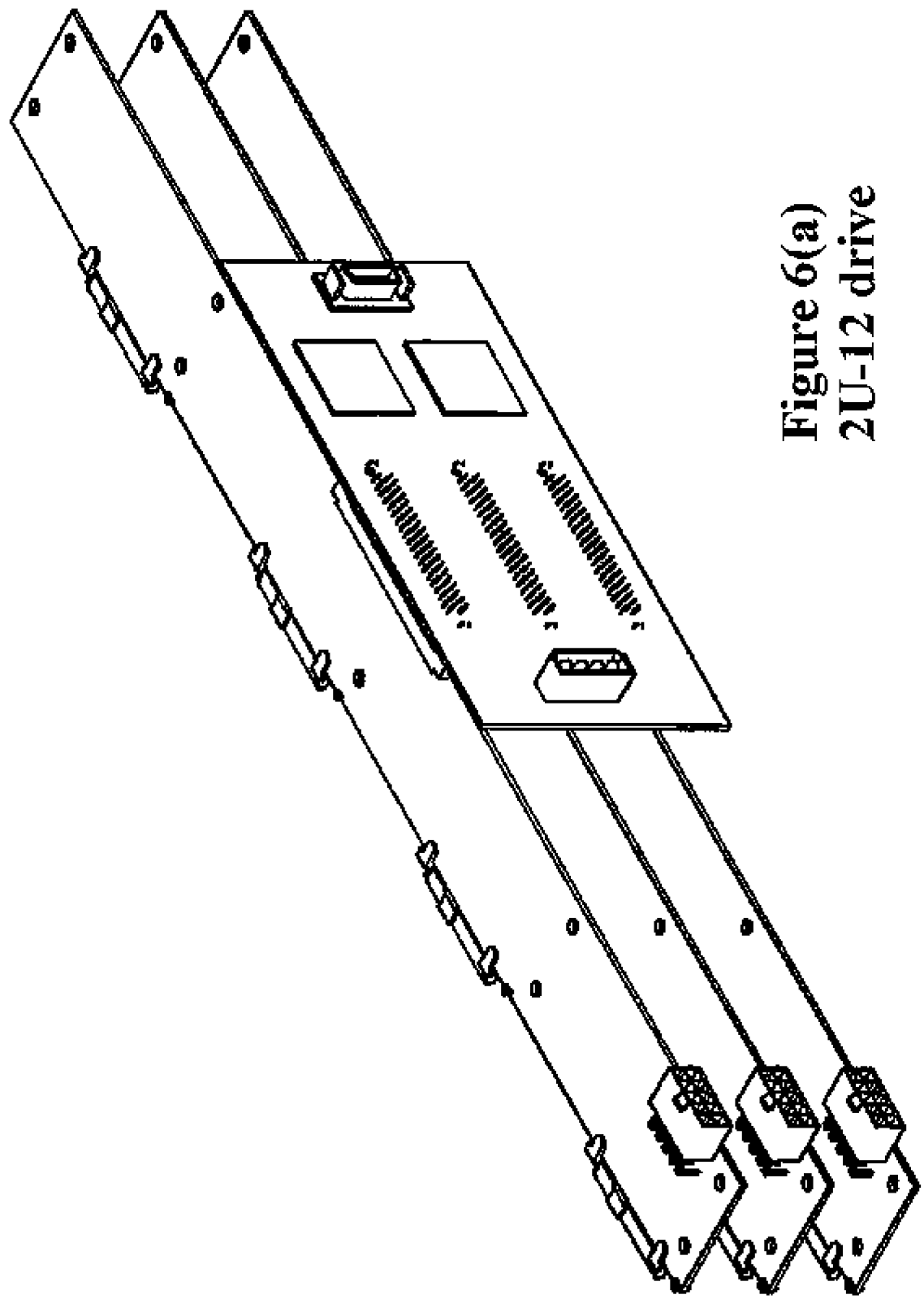

FIGS. 6(a)-(f) illustrate more exemplary solutions enabled by the backplane connection of the present invention. Each configuration will be described as follows:

FIG. 6(a) illustrates a backplane connection for a 2U-12 drive configuration, where the backplane connection uses three universal backplane boards and one SAS expander daughter board. As shown, the connection technology can be made much easier and cheaper, due to the universality of the backplane boards and simplified daughter board(s).

Figure 6B:
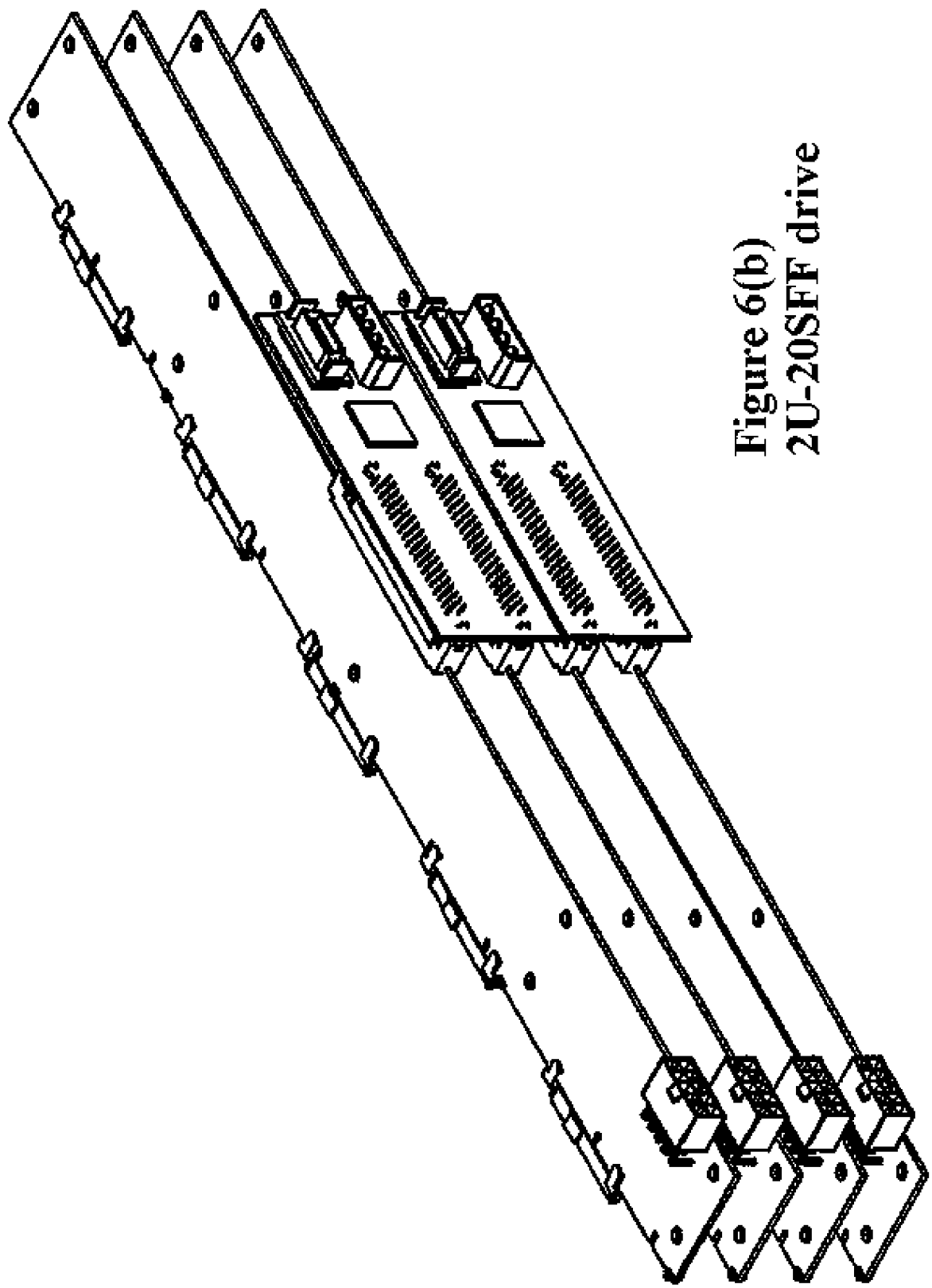

FIG. 6(b) illustrates a backplane connection for a 2U-20 SFF drive configuration, where four universal backplane boards are connected to two daughter boards. Note that four of the same universal backplane boards are used to connect to two simplified daughter boards, which can be easily customized based on the configuration.

FIG. 6(c) illustrates a backplane connection for a 3U-16 SAS/wide port configuration, where four universal backplane boards are connected to one SAS, wide port, daughter board. The same four backplane boards are used, which are now connected to a single daughter board, which has been customized according to the configuration. As can be appreciated by those skilled in the art, customizing the simplified daughter board is much easier and cheaper while the same universal backplane boards are used for this configuration.

Figure 6D:
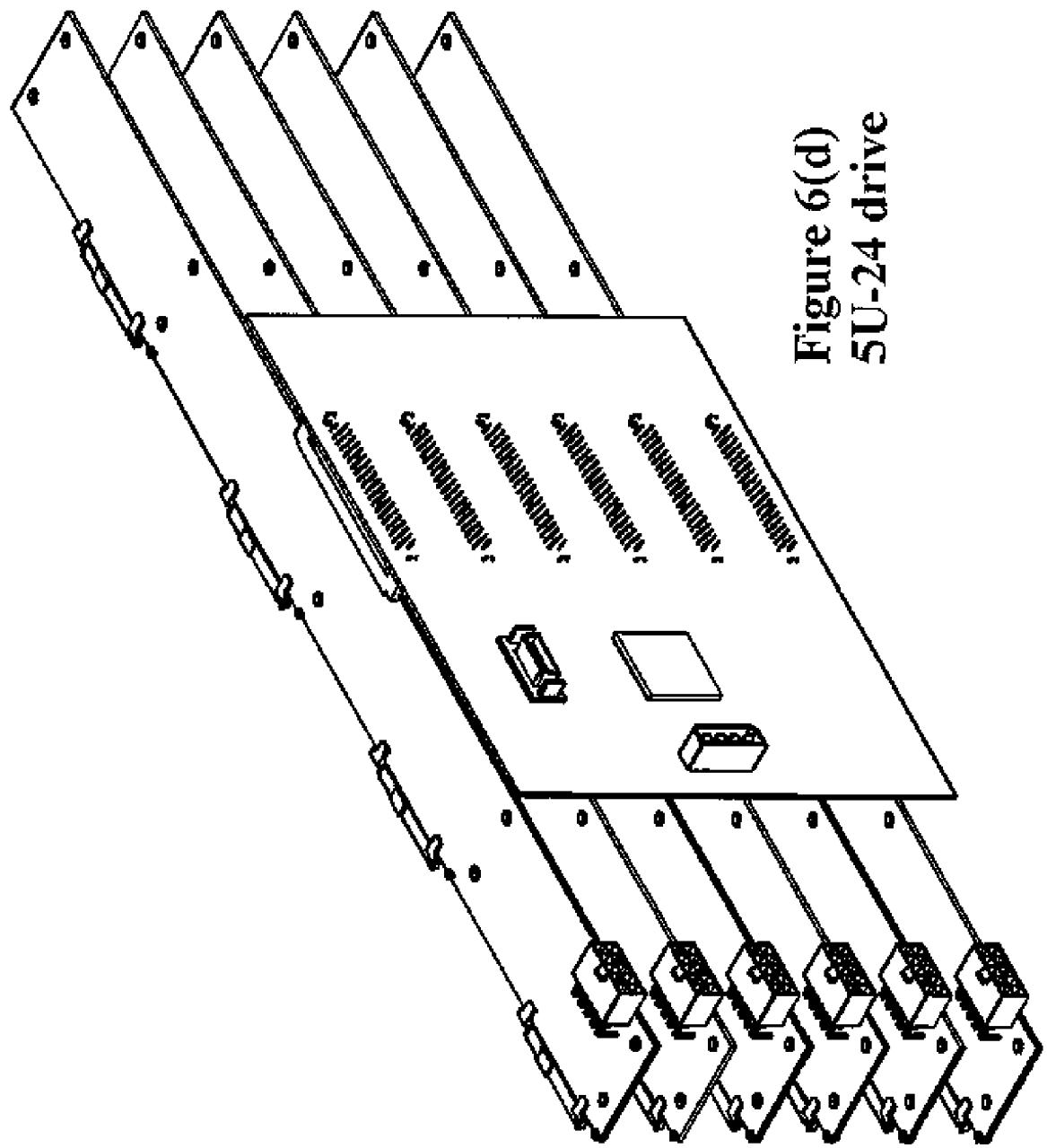

FIG. 6(d) illustrates a backplane connection for a 5U-24 drive configuration, where six backplane boards are connected to a daughter board. Again, six of the same universal backplane board are used, while the daughter board is customized for this configuration.

Figure 6E:
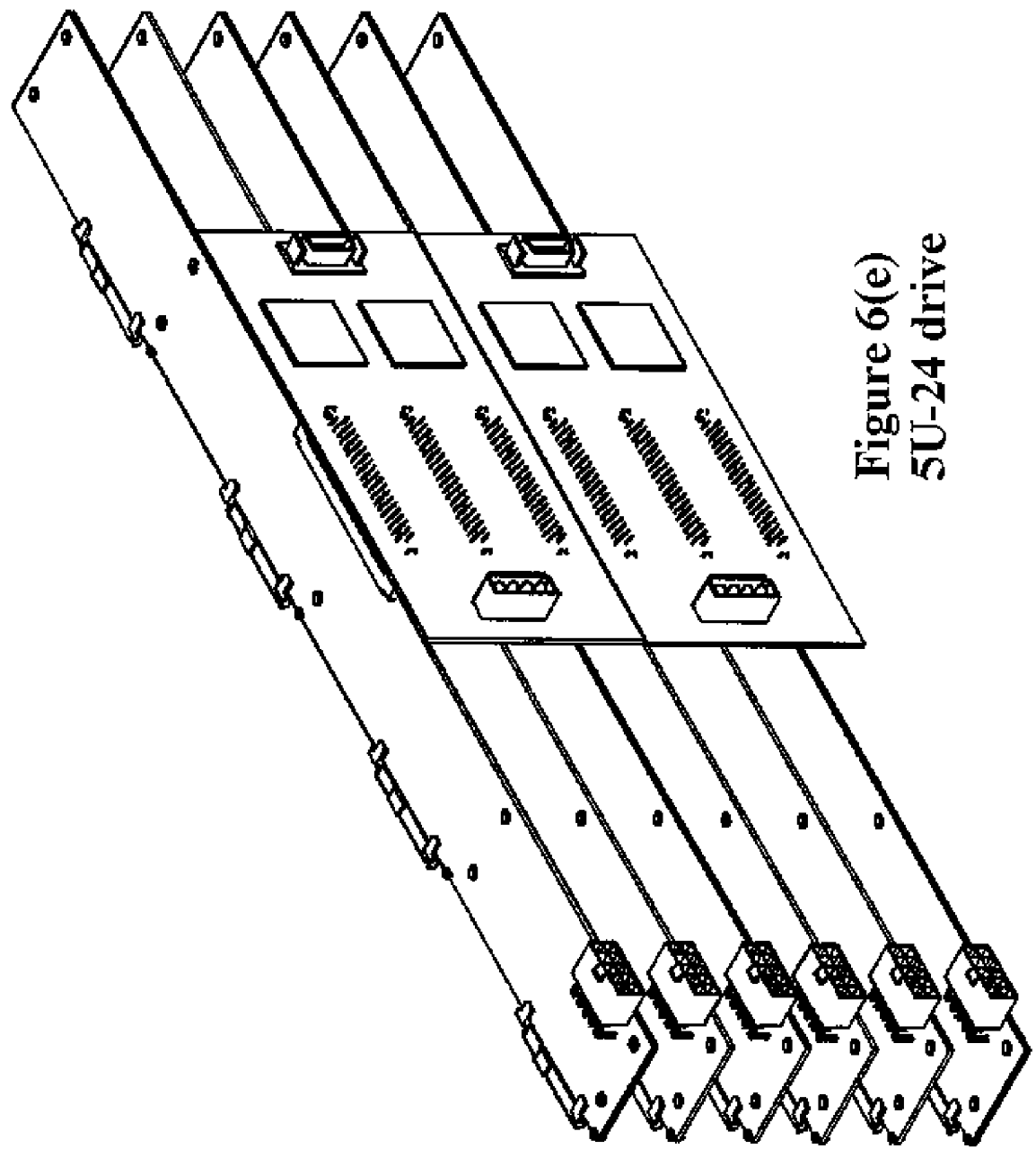

FIG. 6(e) illustrates a backplane connection for a 5U-24 drive configuration, where six backplane boards are connected to two daughter boards. For this configuration, six of the same universal backplane boards are used in connection with two customized daughter boards.

FIG. 6(f) illustrates a backplane connection for a 5U-24 drive configuration, where seven backplane boards are connected to two daughter boards.

ADVANTAGES AND BENEFITS OF THE PRESENT INVENTION

To Backplane Manufacturer and Designer:

Using the conventional method, backplane designers and manufacturers need to develop many backplanes for each solution, the emergence of SAS and backplane connection of the present invention enable manufacturers to develop only one backplane. Vendors can use the same Stock Keeping Unit (SKU) to support many types of storage application, resulting in a much less expensive board.

To OEMs:

The emergence of SAS and the backplane connection of the present invention enable the OEMs to now sell SKU backplane and easily upgrade daughter boards. The flexible solution of the present invention shortens design time, simplifies inventory management, resulting in faster design, less validation efforts, reduced costs while maintaining margins and profitability.

To VARs and System Integrators:

Serial Attached SCSI and backplane connection of the present invention enable VARs and SI to save time in integrating custom solutions, simply by changing the preferred daughter board. VARs no longer need to worry about stocking or integrating a wrong solution. Instead, they can simply populate the backplanes with the desired daughter board. Overall benefits include reduced inventory costs, easier product differentiation, simplified training, support, and reduced cost of ownership.

To End users:

End users not only benefit from the cost reduction from backplane manufacturers, OEMs and VARs, but also the ability to change storage solution without purchasing new systems simplifies the upgrade process and helps future-proof end-user investments.

Serial Attached SCSI, or any fast connecter technology, will offer a new level of performance & availability. The backplane of the present invention empowers customers with great flexibility. IT designers and users will be able to quickly and easily design storage systems, where all these elements can be used without additional system and support costs. Special types of daughter boards which provide special storage application can be swapped in and out as the enterprises' storage needs change. This effectively enables high-performance and low-cost storage maximizing customers' return on investment (ROI), and provides flexibility for future growth.

The advantages of the present invention can be described in the following aspects:

Improve manufacturing: The invention makes it easier to assemble products and also facilitate mass production processes;

Easy to repair: If any component fails, the invention allows technician to quickly replace it with a new one;

Upgradeability: As technology advances, the invention allows the user to replace old SAS daughter board with newer, more sophisticated ones;

Flexibility of design: This invention gives engineers the flexibility to design and integrate new products and components into existing systems.

Although the invention is described herein with reference to the preferred embodiment, one skilled in the art will readily appreciate that other applications may be substituted for those set forth herein without departing from the scope of the present invention. Accordingly, the invention should only be limited by the claims included below.

We claim:

1. A backplane connection for computer storage chassis, said storage chassis comprising at least one HDD (10) and at least one SAS BHA (14), comprising:
   at least one backplane board (30);
   at least one daughter board (33);
   a high speed connection (37), said high-speed connection implemented on one edge of the backplane board being disposed to communicate between said backplane board and said daughter board,
   wherein
   said backplane board is coupled to said HDD said backplane board has a first high-speed terminal for connecting to a high-speed receptacle,
   said daughter board is coupled to said HBA, said daughter board has a second high-speed terminal for connecting to a high speed plug, said daughter board comprises a plurality of general-purpose I/O ports, and a predetermined number of Serial Attach SCSI ("SAS") expanders for enabling multi-HDD support.

2. The backplane connection of claim 1, wherein said high-speed connection is compliant with SAS connection protocols.

3. The backplane connection of claim 2, further comprising:
   at least one SAS HBA connector implemented on said daughter board, adapted to connect to said daughter board to said SAS HBA;
   at least one hot-swappable HDD connector implemented on said backplane board, adapted to connect to said backplane board to said HDD.

4. The backplane connection of claim 2, wherein:
   said backplane board is of the same design without regard to changes in said computer storage chassis and said daughter board is customized based on changes in said computer storage chassis.

5. The backplane connection of claim 3, wherein:
   said backplane board is of the same design without regards to changes in said computer storage chassis and said daughter board is customized based on changes in said computer storage chassis.

6. A backplane connection system for use in a computer storage chassis, said computer storage chassis having at least one HDD and at least one HBA, said backplane connection comprising:
   at least one daughter board, each daughter board comprising:
      a multi-layered printed circuit board having a predetermined pattern of daughter board data paths thereon;
      at least one HBA connector implemented on said printed circuit board, said HBA connector being coupled to one terminal of said daughter board data paths, said HBA connector being adapted to communicate between said at least one HBA and said daughter board data paths;

a first high-speed connector terminal implemented on said daughter board, said first connector terminal being coupled to another terminal of said daughter board data paths;

SAS expander circuitry implemented on said daughter board, said expander circuitry being adapted to enable multi-HDD support and data communication between said at least one HBA connector and said first high-speed connector terminal;

at least one universal backplane, each comprising:

a multi-layered printed circuit board having a predetermined pattern of data paths thereon;

a second high-speed connector terminal implemented on one edge of the board, said second connector terminal being coupled to one terminal of the data paths;

a plurality of HDD connectors implemented on another edge of the board, each said HDD connector being coupled to another terminal of the data paths, each of said HDD connectors being adapted to be controllably connected to at least one HDD a power supply unit being adapted to supply power to both of said daughter boards and said universal backplane.

7. The backplane connection system of claim 6, wherein said first and second high-speed connector terminals are compliant with SAS protocols, and said at least one HBA connector is compliant with SAS protocols.

8. The backplane connection system of claim 6, wherein said universal backplane is one of the same design without regard to changes in said computer storage chassis and said daughter board is customized based on changes in said computer storage chassis.

9. The backplane connection of claim 7, wherein:

said universal backplane board is of the same design without regard to changes in said computer storage chassis and said daughter board is customized based on changes in said computer storage chassis.

10. A method of using a fixed backplane design to connect with a first plurality of SAS HBAs and a second plurality of HDDs in a computer storage chassis, comprising:

building a universal backplane based on said fixed backplane design, said backplane comprising:

a first high-speed connection terminal implemented on one edge of the backplane;

a plurality of hot-swap HDD connectors for controllably connecting to said HDDs;

a plurality of predetermined data paths connecting between said first high-speed connection terminal and said HDD connectors;

designing a daughter board based on said first plurality of SAS HBAs and said second plurality of HDDs, said daughter board comprising:

a second high-speed connection terminal, adapted to be controllably connected with said first high speed connection terminal;

a plurality of SAS HBA connectors for controllably connecting to said SAS HBA's a plurality of predetermined data paths connecting between said second high-speed terminal and said SAS HBA connectors;

at least one expander circuitry for enabling multi-HDD support;

connecting said backplane to said daughter board by engaging said first high-speed connection terminal with said second high-speed connection terminal;

connecting said backplane to said HDD's;

connecting said daughter board to said SAS HBAs;

connecting power to said universal backplane and said daughter board.

11. The method of claim 10, wherein said high-speed connection is compliant with SAS protocols.

12. The method of claim 11, wherein said universal backplane board is always of the same design without regard to changes in said HBAs and HDDs, and said daughter board is customized based on said HBAs and HDDs.

13. The method of claim 10, wherein said expander circuitry is an SAS expander.

14. The method of claim 12, wherein said expander circuitry is an SAS expander.

* * * * *